United States Patent

Braddock

[15] 3,662,193

[45] May 9, 1972

[54] TRI-STABLE CIRCUIT

[72] Inventor: Robert C. Braddock, Encino, Calif.

[73] Assignee: International Telephone and Telegraph Corporation, New York, N.Y.

[22] Filed: May 24, 1971

[21] Appl. No.: 146,091

[52] U.S. Cl. ..............................307/291, 307/215, 307/218, 307/289, 328/205

[51] Int. Cl. ....................................H03k 19/34, H03k 19/24

[58] Field of Search ..................307/215, 218, 289, 209, 291; 328/205

[56] References Cited

UNITED STATES PATENTS 3,012,155 12/1961 Jagger ................................307/289 X 3,474,262 10/1969 Turcotte ............................307/218 X

*Primary Examiner*—Donald D. Forrer

*Assistant Examiner*—B. P. Davis

*Attorney*—C. Cornell Remsen, Jr., Walter J. Baum, Paul W. Hemminger, Charles L. Johnson, Jr. and Thomas E. Kristofferson

[57] ABSTRACT

A tri-stable digital logic circuit, the outputs of which follow the inputs at the next clock pulse. Each of the three inputs and outputs is adapted to accept a two-level, i.e., binary input and to provide a corresponding output and store the said input condition through successive clock pulses until a change of at least one of the input values occurs.

7 Claims, 2 Drawing Figures

INVENTOR
ROBERT C. BRADDOCK
BY William T. O'Neil
AGENT

INVENTOR
ROBERT C. BRADDOCK
BY William T. O'Neil
AGENT

TRI-STABLE CIRCUIT

BACKGROUND OF THE INVENTION

1. Field of the Invention

The present invention relates to digital logic circuitry.

2. Description of the Prior Art

The most basic prior art related to the field of the present invention is that of the well known bistable or "flip-flop" circuit which is a key element in the instrumentation of digital computers.

A more specific area of the prior art concerns tri-stable flip-flops. The trade magazine "Electronic Design", Peter Coley, publisher — New York, New York, describes a prior art approach to the tri-stable flip-flop in its "Ideas for Design" section of the issue of May 10, 1966. The circuit therein illustrated does not provide for clock pulse change of state. Moreover, the addition of instrumentation to effect clock pulse operation would require additional development effort over that prior art circuit.

Various other tri-stable circuits have been suggested in this art, however, most are either unduly complex or do not provide for clock pulse operation. The manner in which the circuit of the present invention overcomes the shortcomings of prior art devices of the type will be evident as this description proceeds.

SUMMARY

The instrumentation of the present invention involves the use of only three current controllable elements, preferably solid state devices (transistors) with minimum additional hardware, these functioning as logical NOT circuits. Each of these is preceded by a four input OR circuit, each OR and each NOT circuit comprising a NOR logical combination. The said OR circuit inputs include two inputs for each OR circuit to receive feedback to hold the condition after each clock pulse passes. The other two inputs of each of the OR circuits comprise the inputs of the other two stages in each case, mixed with the clock pulse signal.

The said clock pulse is sometimes referred to as an enabling or strobe signal. In any event, it should be of relatively short duration, a requirement which is commonly encountered in the instrumentation of digital computing equipment.

The following is a state table which describes the logical performance of the circuit of the present invention:

| INPUTS 1 | 2 | 3 | NEXT OUTPUT Q1 | Q2 | Q3 |
|---|---|---|---|---|---|
| Grd | Grd | Grd | | No Change | |
| -V | Grd | Grd | -V | Grd | Grd |
| Grd | -V | Grd | Grd | -V | Grd |
| Grd | Grd | -V | Grd | Grd | -V |

In the above table, the ground (Grd) indications may be thought of as logical zeros and the −V indications as logical "ones" in the binary sense. Also, the value −V may be thought of as "high" input or output of "Grd" as low.

The other four possible combinations of inputs are not allowable and result in one of the three listed stable states indeterminately. The outputs listed above obtain during the clock pulse and remain in the indicated state thereafter until there is an input condition change injected into the circuit by the next following clock pulse. Thus the operation is similar to that of a so-called "set-reset dc clocked flip-flop".

The details of the circuit of the present invention will be better understood as this description proceeds.

It may be said to have been the general object of the present invention to produce an efficient clock pulse operated tri-stable binary compatible, logical flip-flop type circuit for digital computer use.

DESCRIPTION OF THE PREFERRED EMBODIMENT

Figure 1:
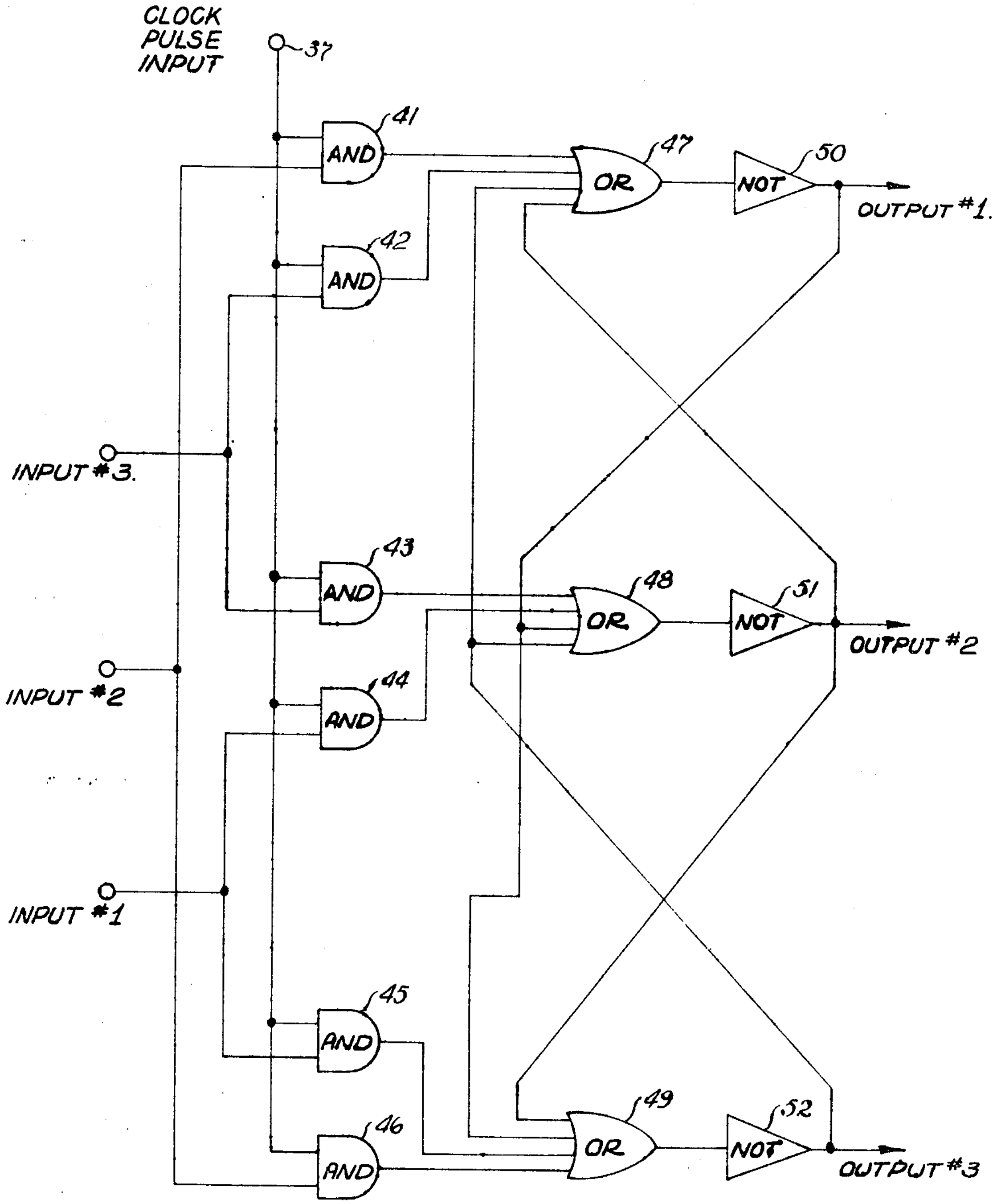
FIG. 1 is a logic diagram for the tri-stable circuit of the present invention.

Referring now to FIG. 1, a logic diagram for the device of the present invention is shown. Each of the OR circuits 47, 48 and 49, combined with a corresponding one of the NOT circuits 50, 51 and 52, respectively, produces three logical NOR circuits, one corresponding to each of the three stages or outputs. Each of these NOR circuit combinations receives the outputs of two AND circuits. AND circuits 41 and 42 provide inputs for the NOR circuit combination including 47 and 50, while AND circuits 43 and 44 provide inputs for the NOR circuit combination including 48 and 51 and the AND circuits 45 and 46 provide a pair of inputs for the 49 and 52 NOR circuit combination. Each of the said AND circuits 41 through 46 receives a clock pulse input from 37, but can only have an output to the OR circuit portion following if a "high" signal value is also present from one of the inputs 1, 2 or 3 feeding that stage. It will be seen therefore, that each pair of AND circuits corresponding to one of the output channels provides an OR circuit input during a clock pulse and during the presence of a "high" on either of the AND circuit inputs corresponding to a particular output channel. This triggers the change of state of a given one of the output terminals in accordance with the state table hereinabove.

Since the circuit is symmetrical, a description of operation for one output channel applies typically, the operation of the other two being obvious therefrom.

If the circuits corresponding to output number 1 are considered, it will be realized that an output from OR circuit 47 to NOT circuit 50 will be extant whenever one or more of the four inputs thereto is energized by a "high". In the preferred instrumentation herein described, a "high" is considered to be the signal −V and the clock pulses provided at 37 are therefore negative signals of comparable amplitude. Thus, it will be seen that an output from OR circuit 47 to NOT circuit 50 occurs during a clock pulse as a result of a high signal passing through AND circuit 41 from input number 2 or through AND circuit 42 from a high at input number 3. The relation of this function to the hereinbefore presented state table can be recognized considering one additional structural feature, namely, the locking feedback signals. It will be noted that each of the NOT circuits 50, 51 and 52, in addition to providing an output terminal for the device, provides a feedback signal to one of the OR circuit inputs in each of the other two channels. Thus NOT circuit 50 provides an input to OR circuits 48 and 49. NOT circuit 51 similarly energizes an input of OR circuit 47 and an input of OR circuit 49, and moreover, NOT circuit 52 energizes an input of OR circuit 47 and one of OR circuit 48. The manner in which this feedback function serves to provide latching action will be more fully understood in connection with the further description herein.

Figure 2:
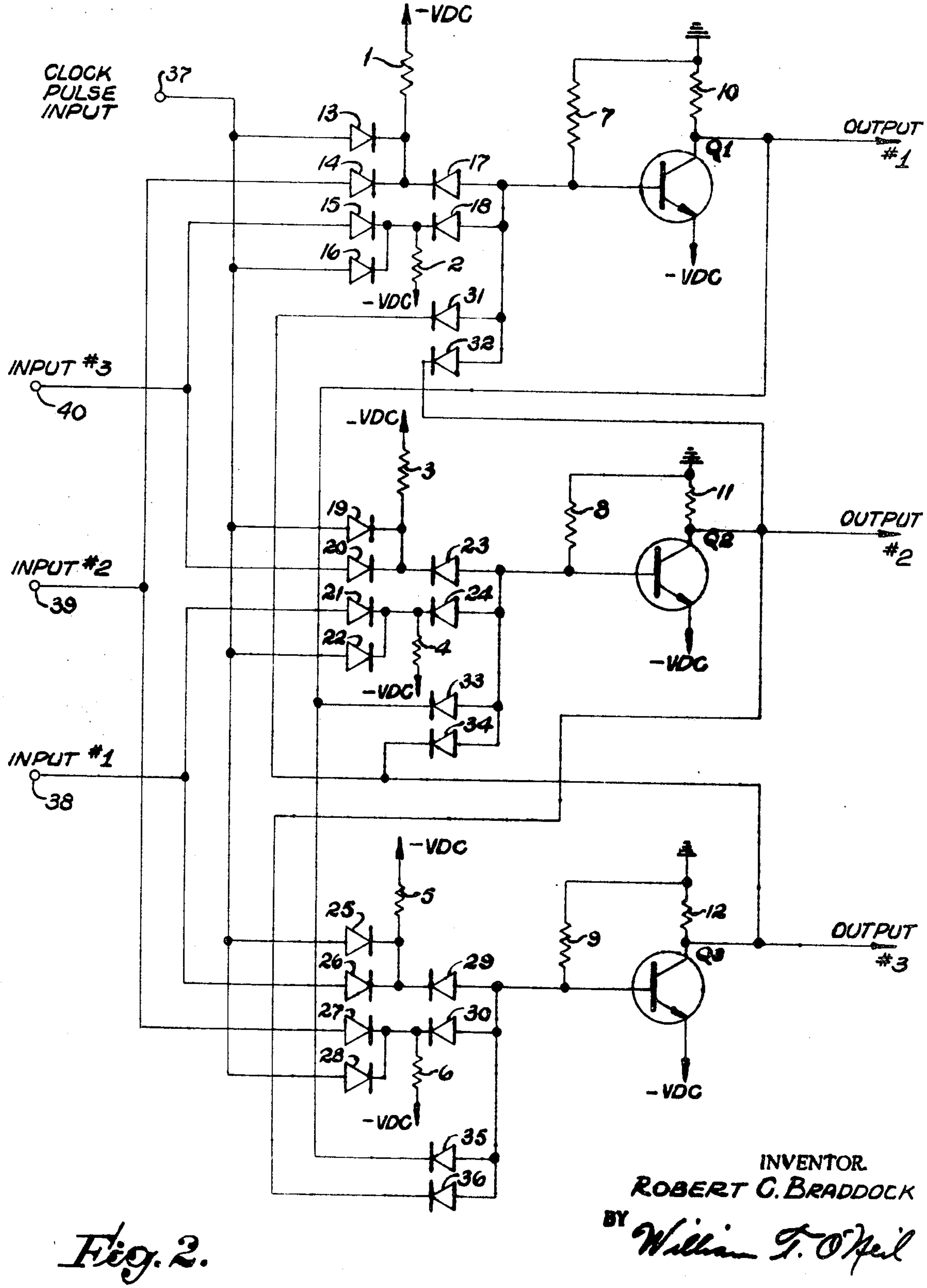
FIG. 2 is a detailed schematic illustrating a typical instrumentation of the device in accordance with the logic diagram of FIG. 1.

Referring now to FIG. 2, a schematic circuit diagram for the detailed instrumentation of the device of FIG. 1 will be described.

Transistors Q1, Q2 and Q3 with their respective collector resistors 10, 11 and 12, may be thought of as constituting the NOT circuit stages 50, 51 and 52, respectively. These transistors are of the NPN type as illustrated, and are provided with a common negative direct current emitter supply. The power source then will be understood to have a grounded positive supply terminal. The four-input OR circuits represented in FIG. 1 as 47, 48 and 49, comprise four diodes for each stage along with a common anode-to-ground resistor in each stage. The said common anode resistors are 7 for the number 1 stage, and 8 and 9 for stages 2 and 3, respectively. These resistors also operate as base return resistors for their respective transistors Q1, Q2 and Q3.

From the foregoing, it will be realized that the OR circuit for the output 1 stage includes the diodes 17, 18, 31 and 32 and resistor 7. For the second stage, the OR circuit comprises diodes 23, 24, 33, 34 and resistor 8. Similarly, diodes 29, 30, 35 and 36, along with resistor 9, comprise the elements of the OR circuit for the output number 3 stage.

The AND circuit 41 comprises the diodes 13 and 14, along with resistor 1. AND circuit 42 comprises diodes 15 and 16, along with resistor 2. For the output two stage (including transistor Q2) the diodes 19 and 20, along with resistor 3, serve as AND circuit 43 while the diodes 21 and 22 with resistor 4 serve as AND circuit 44. Similarly, for the third stage diodes 25 and 26, along with resistor 5, afford the function of AND circuit 45, whereas diodes 27 and 28 with resistor 6, provide the AND circuit function of 46.

The application of diode networks to perform such AND and OR circuit functions is of itself well understood in the digital computer arts. The unilateral characteristics of such diodes provide the required logical signal mixing while inhibiting back currents which would otherwise cause interactions destroying the intended function of the circuit.

The feedback paths from the collector outputs of the three transistors are readily traced. For example, the Q1 output is applied to the base of Q2 through diode 33 and to the base of Q3 through diode 35. The feedback from the output of Q2 reaches the base of Q1 through diode 32 and the base of Q3 through diode 36. Similarly, the latching feedback output from Q3 reaches the base of Q1 through diode 31 and the base of Q2 through diode 34.

As indicated previously, a −V is regarded as a high input or output condition and "Grd" is regarded as a "low" input or output condition. The AND, OR and NOT circuits involved in the circuit of the present invention each perform their well known logical functions as such. A NOT circuit is, in fact, similar in operation to an inverter. An AND circuit of two inputs provides an output only when signal is present, or in this case, when highs are present at both inputs. OR circuits combine signals and provide an output where one or more of their input terminals are energized in accordance with the logic of the circuit.

Some additional comments of help in understanding the nature and operation of the present circuit follow.

A "high" on input 1 will be seen to cause the collector voltages of Q2 and Q3 to go essentially to ground potential. Each output collector feedback path provides the bases of the other two transistors with a −V signal which latches the other two to hold the condition resulting from the application of the clock pulse after the said clock pulse passes. The common cathodes of the AND gate diodes are obviously at ground potential when any of their inputs is at ground. Similarly, if any input of any of the aforementioned OR gates is at −VDC, the base of the corresponding transistor is held at −VDC. The collector of one transistor is always at −VDC, while the other two collectors are always at ground (corresponding to any stable state in accordance with the foregoing table). As one transistor is "-turned on" it turns off the other two regardless of the states of inputs 1, 2 and 3. These inputs are normally all at ground when no change of state is desired. Applying −VDC to either of the two inputs connected to the transistor which is "on" causes it to switch "off" (when −VDC appears on the clock pulse input). That transistor will remain "off" due to the ground at the collectors of the other two transistors applying reverse biasing to the diodes connected to the base of such transistor.

Additional AND diodes could obviously be added to the circuit of the present invention. The complement outputs, $\overline{Q1}$, $\overline{Q2}$, and $\overline{Q3}$ can readily be obtained, through the use of diodes from the collectors of the transistors forming two-input OR gates functioning as follows:

$$\overline{Q1} = Q2 + Q3$$
$$\overline{Q2} = Q1 + Q3$$
$$\overline{Q3} = Q1 + Q2$$

Outputs $Q2$ and $Q3$ produce natural binary weighted codes of values 0, 1, and 2. Logic 0 is regarded as ground in that instance. Stated otherwise, it may be said that each pair of outputs provides three possible combinations in accordance with the following:

| Input Energized | Next Q3 Output | Next Q2 Output |
|---|---|---|
| 1 | 0 | 0 |
| 2 | 0 | 1 |
| 3 | 1 | 0 |

Concerning the instrumentation of the circuit, it will be realized that either discrete component construction or integrated circuit construction, is possible. The ideal situation for greatest space efficiency and general utility is likely to be a custom design of the tri-stable device of the present invention on a monolithic chip.

Silicon diodes used in the circuit tend to make it less sensitive to noise triggering, however, the use of germanium diodes is possible. In a particular instrumentation, type 1N914 diodes were chosen and type 2N2481 transistors were employed. The selection of resistors 10, 11 and 12 is a matter of design, considering the emitter-collector current carrying capability of the transistors and other design and interface factors. Resistors R 7, 8 and 9 should normally be on the order of 40 times the ohmic value of resistors 1, 2, 3, 4, 5 and 6, the latter being of the general order of 1000 ohms in one particular design.

In some computer system designs it is desirable or necessary to effect clock pulse control as of the end, rather than at the beginning of each clock pulse. Although the present circuit inherently triggers early on each clock pulse, the addition of an RC type differentiator in the line 37 would provide the appropriate timing relationships in such cases.

Obviously, the present invention can also be instrumented using PNP transistors with appropriate supply voltage modification.

Various additional modifications and alterations of the circuit of the present invention are possible and will suggest themselves to those skilled in these arts, once the general concept of the present invention is well understood. Accordingly, it is not intended that scope of the present invention should be limited by the showing of the drawings or this description, these being typical and illustrative only.

What is claimed is:

1. A tri-stable digital logic circuit having a clock pulse input, three circuit stages each with a discrete logical output terminal and a corresponding logic input terminal, said circuit assuming and retaining the pattern of digital logic values at said logic inputs on said corresponding logic outputs after each clock pulse, comprising the combination of:
   - a logical NOR circuit within each of said stages, the outputs of said NOR circuits constituting said logic output terminals, each of said NOR circuits having plural inputs to which it is responsive;
   - first and second AND circuits within each of said stages, said AND circuits each having first and second inputs;
   - means connecting all of said first inputs of said AND circuits to said clock pulse input;
   - means connecting said second inputs of each pair of said AND circuits corresponding to each given stage, one each to one of the two of said logic inputs other than the logic input corresponding to said given stage;
   - means connecting the outputs of each of said pair of AND circuits in each of said stages to a pair of said NOR circuit inputs in the same stage;
   - and latching feedback means comprising a connection from each of said NOR circuit outputs to one of said plural NOR circuit inputs of each stage other than its own.

2. Apparatus according to claim 1 in which said NOR circuits each comprise a plural input OR circuit connecting to a NOT circuit, whereby said NOR circuit output for each stage is the output of the corresponding NOT circuit.

3. Apparatus according to claim 2 in which said NOT circuits each comprises a current controllable element having two principal current carrying electrodes and a control electrode, said output NOT outputs being one of said principal current carrying electrodes, and said connection from the output of said OR circuit in each of said stages is applied to said control electrode of said current controllable element of said corresponding NOT circuit.

4. Apparatus according to claim 3 in which said current controllable element is a solid state device having an emitter and a collector comprising said principal current carrying electrodes, and said control element is the base of said solid state device.

5. Apparatus according to claim 4 in which said OR circuits comprise plural diodes with common connection from said base of said solid state device to the paralleled like electrodes of said diodes, the remaining electrodes of said diodes comprising said OR circuit inputs.

6. Apparatus according to claim 1 in which said AND circuits each comprise a pair of diodes poled with like electrodes interconnected to form an output, the remaining electrodes thereby forming said inputs for each of said AND circuits.

7. Apparatus according to claim 5 in which said AND circuits each comprise a pair of diodes poled with like electrodes interconnected to form an AND circuit output, th remaining electrodes thereby forming said inputs for each of said AND circuits, said AND circuit outputs each being connected to a corresponding one of said OR circuit inputs.

* * * * *